(No Model.)

J. H. & E. B. WEAVER.
THILL COUPLING.

No. 340,746. Patented Apr. 27, 1886.

WITNESSES:
Harry L. Bowman
Wm. J. Mingle

INVENTORS
Jacob H. Weaver
Enos B. Weaver
BY
ATTORNEY

UNITED STATES PATENT OFFICE.

JACOB H. WEAVER AND ENOS B. WEAVER, OF EAST LAMPETER, LANCASTER COUNTY, PENNSYLVANIA.

THILL-COUPLING.

SPECIFICATION forming part of Letters Patent No. 340,746, dated April 27, 1886.

Application filed March 26, 1886. Serial No. 196,634. (No model.)

*To all whom it may concern:*

Be it known that we, JACOB H. WEAVER and ENOS B. WEAVER, citizens of the United States, residing at East Lampeter township, in the county of Lancaster and State of Pennsylvania, have invented certain new and useful Improvements in Thill-Couplings for Vehicles; and we do hereby declare the following to be a full, clear, and exact description of the invention, such as will enable others skilled in the art to which it appertains to make and use the same.

Figure 1:
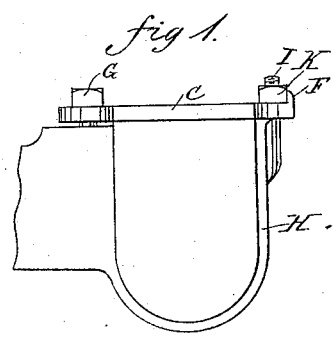
Figure 2:
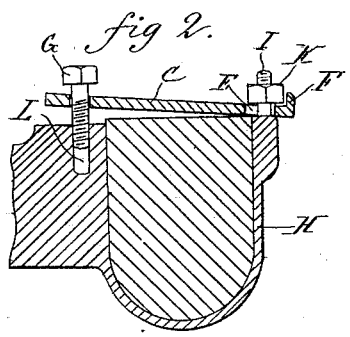
Figure 3:
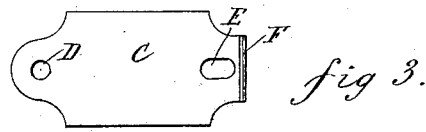
Figure 4:
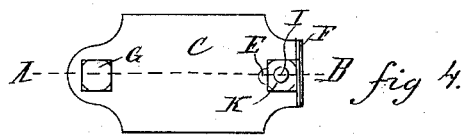

Figure 1 is a perspective end view showing the strap attached to the clip; Fig. 2, a sectional end view through the line A B, Fig. 4; Fig. 3, a top view of the strap off of the clip; Fig. 4, a top view of the same with the tap bolt and nut in place.

Similar letters refer to similar parts throughout the several views.

The nature of our invention consists in supplying a strap for the thill-couplings and shaft-clips which shall prevent the screw-nut which holds said strap fast to the clip from coming undone by the jar of the vehicle. This object we attain by making the strap C in Fig. 3 with a round hole, D, in one end and an oblong hole, E, in the other, with a raised flange, F, as in Fig. 2, which will press against one side of the screw-nut when drawn down by the tap-bolt G, Fig. 2, thereby preventing its coming loose.

The manner of applying this strap will be better understood by referring to Fig. 2. The oblong hole of the strap C is put onto the screwed shank of the clip I and the nut K screwed down so as to draw the strap up on an angle, as shown, with one of its flat sides turned so as to be parallel with the projecting flange F. The strap is then driven over so as to bring the flange in contact with this side of the nut and the round hole opposite the tapped hole in the body of the clip L, and the tap-bolt G placed in position and screwed down firmly, thereby forming a substantial lock for the nut K.

The object of the oblong hole E in Fig. 3 is to allow the strap to be drawn over far enough to allow the corners of the nut K to turn past the inner face of the raised flange F in Fig. 2.

What we claim as our invention, and desire to secure by Letters Patent, is—

In combination with the thill-clip H, a strap with a projecting flange and an oblong hole for the screwed shank of the clip, by which means the projecting flange can be brought in contact with the side of the nut K and held there by means of the tap-bolt G, so as to form a positive lock for the same, substantially as herein set forth and described.

In testimony whereof we affix our signatures in presence of two witnesses.

JACOB H. WEAVER.
ENOS B. WEAVER.

Witnesses:
A. F. SHENCK,
D. H. KULP.